(12) United States Patent
Watanabe

(10) Patent No.: US 11,012,589 B2
(45) Date of Patent: May 18, 2021

(54) IMAGE PROCESSING APPARATUS AND NON-TRANSITORY COMPUTER READABLE MEDIUM WITH BACKGROUND EMPHASIS OF REDUCED IMAGE

(71) Applicant: FUJI XEROX CO., LTD., Tokyo (JP)

(72) Inventor: Masaki Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 480 days.

(21) Appl. No.: 15/808,509

(22) Filed: Nov. 9, 2017

(65) Prior Publication Data

US 2018/0309902 A1 Oct. 25, 2018

(30) Foreign Application Priority Data

Apr. 19, 2017 (JP) .............................. JP2017-082689

(51) Int. Cl.
*H04N 1/393* (2006.01)
*H04N 1/60* (2006.01)
*H04N 1/407* (2006.01)
*H04N 1/64* (2006.01)

(52) U.S. Cl.
CPC ............. *H04N 1/393* (2013.01); *H04N 1/407* (2013.01); *H04N 1/60* (2013.01); *H04N 1/642* (2013.01); *H04N 2201/0082* (2013.01)

(58) Field of Classification Search
None
See application file for complete search history.

(56) References Cited

U.S. PATENT DOCUMENTS

| 2011/0255777 | A1* | 10/2011 | Matsuoka ............ H04N 1/4092 382/164 |
| 2013/0148886 | A1* | 6/2013 | Misawa ................... G06T 9/00 382/165 |
| 2015/0077772 | A1 | 3/2015 | Satou et al. |

FOREIGN PATENT DOCUMENTS

| JP | 2012-123692 A | 6/2012 |
| JP | 2014-123794 A | 7/2014 |
| JP | 2015-008540 A | 1/2015 |
| JP | 2015-060356 A | 3/2015 |

OTHER PUBLICATIONS

Mar. 1, 2021 Office Action issued in Japanese Patent Application No. 2017-082689.

* cited by examiner

*Primary Examiner* — Lennin R Rodriguezgonzalez
(74) *Attorney, Agent, or Firm* — Oliff PLC

(57) ABSTRACT

An image processing apparatus includes a first generation unit and a second generation unit. The first generation unit generates reduced original image data for forming a reduced image of an original image to be formed on the basis of print data. The second generation unit generates background-emphasized reduced image data for forming a reduced image in which a reduced background region is emphasized in the reduced image, and the reduced background region corresponds to a background region of an object included in the original image.

10 Claims, 13 Drawing Sheets

EXPECTED PRINT

ACTUAL PRINT

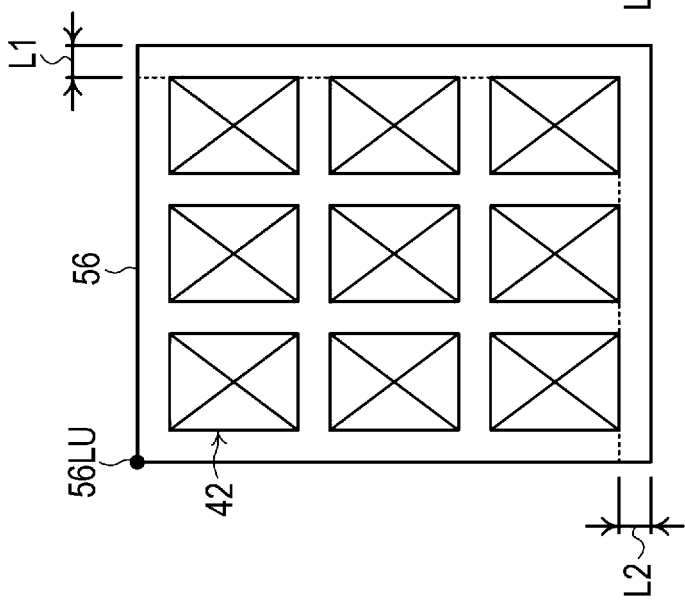
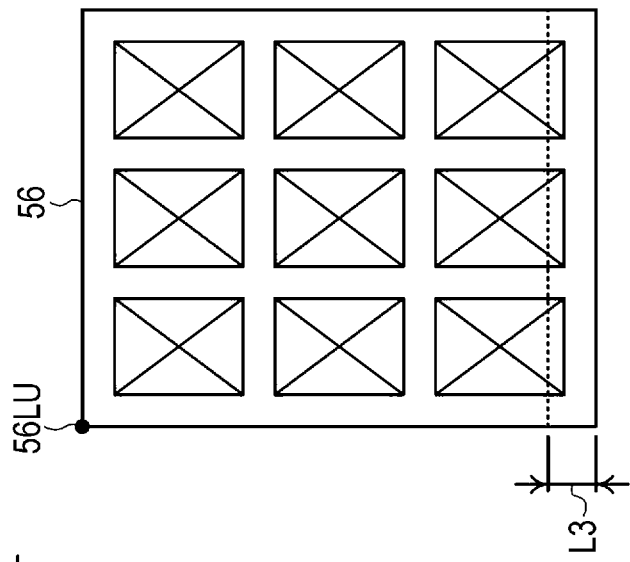
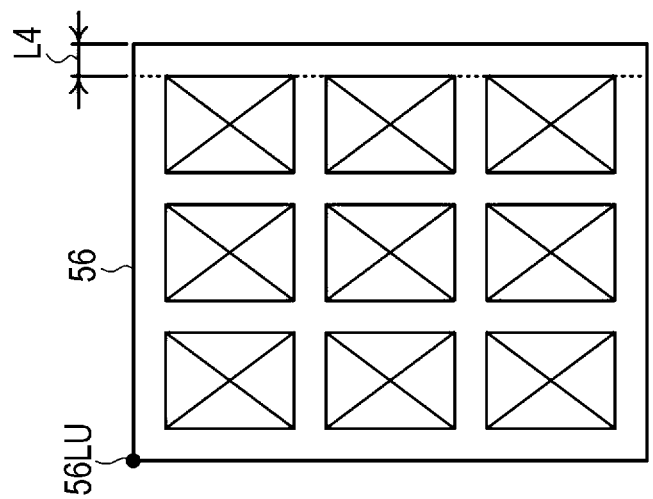

IMAGE PROCESSING APPARATUS AND NON-TRANSITORY COMPUTER READABLE MEDIUM WITH BACKGROUND EMPHASIS OF REDUCED IMAGE

CROSS-REFERENCE TO RELATED APPLICATIONS

This application is based on and claims priority under 35 USC 119 from Japanese Patent Application No. 2017-082689 filed Apr. 19, 2017.

BACKGROUND

(i) Technical Field

The present invention relates to an image processing apparatus and a non-transitory computer readable medium.

(ii) Related Art

When a user issues an instruction for printing an original image on a sheet of paper, in some cases, the original image may be subjected to image processing including an automatic function of, for example, automatically enlarging and reducing the original image in a print area. In this case, the user is able to check, in the reduced image, the original image to be printed.

SUMMARY

According to an aspect of the invention, there is provided an image processing apparatus including a first generation unit and a second generation unit. The first generation unit generates reduced original image data for forming a reduced image of an original image to be formed on the basis of print data. The second generation unit generates background-emphasized reduced image data for forming a reduced image in which a reduced background region is emphasized in the reduced image, and the reduced background region corresponds to a background region of an object included in the original image.

BRIEF DESCRIPTION OF THE DRAWINGS

Exemplary embodiments of the present invention will be described in detail based on the following figures, wherein:

FIGS. 9A to 9C illustrate exemplary target areas of a color converting process performed on a reduced original image;

DETAILED DESCRIPTION

Figure 1:
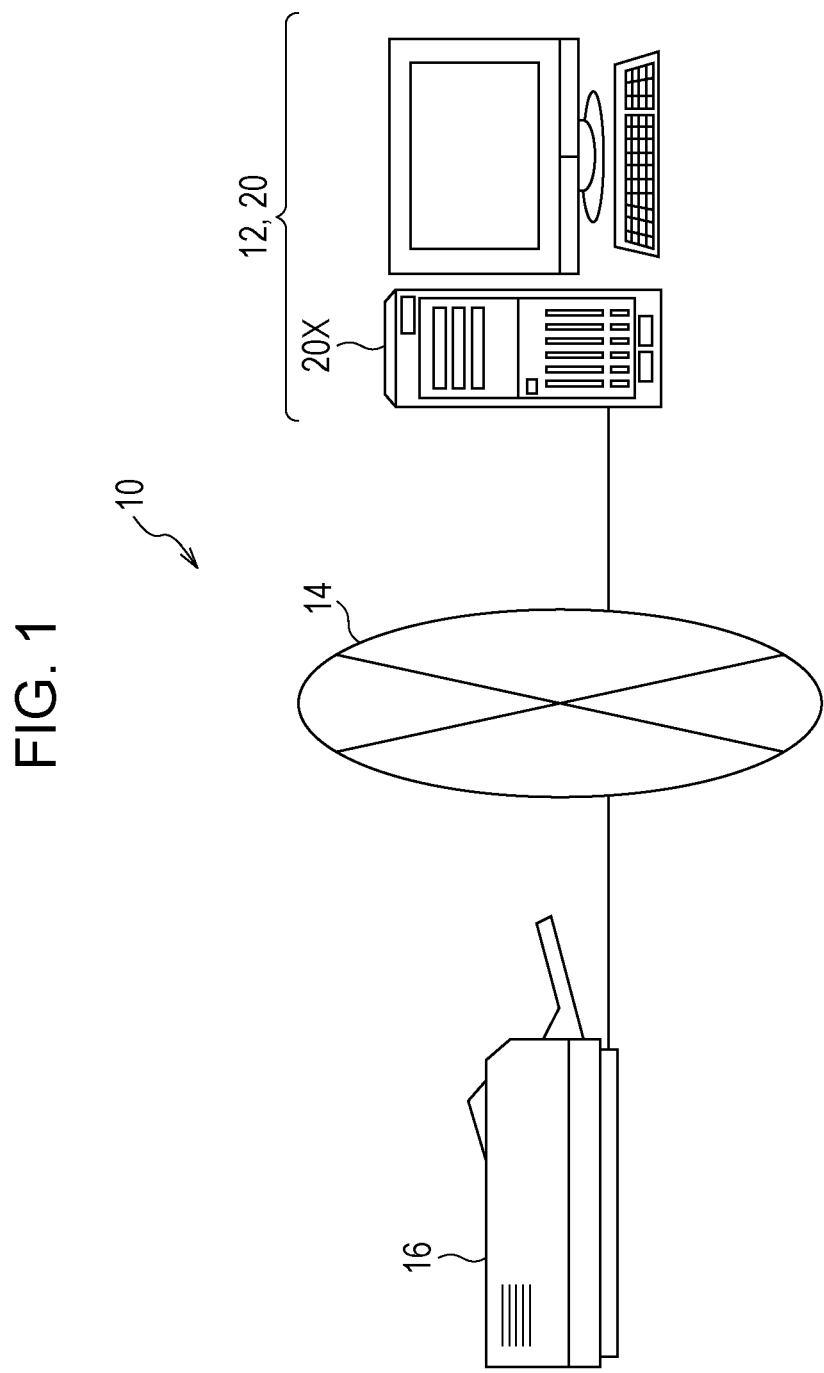
FIG. 1 schematically illustrates an exemplary configuration of a printing system including an image processing unit according to a first exemplary embodiment.

Hereinafter, an exemplary image forming apparatus according to an exemplary embodiment of the present invention will be described in detail with reference to the drawings. Note that components and processes having substantially the same effects and functions will be denoted by the same reference numerals in all the drawings, and a repeated description may be omitted as appropriate.

First Exemplary Embodiment

FIG. 1 illustrates an exemplary configuration of a printing system 10 including an image processing unit 12 according to this exemplary embodiment. The printing system 10 includes the image processing unit 12, a communication line 14 for the Internet, a local area network, or the like, and an image forming unit 16 such as a printer. Print data is transmitted to the image forming unit 16 such as a printer from the image processing unit 12 through the communication line 14 for the Internet, a local area network, or the like, and the image forming unit 16 forms an original image based on the print data on a sheet of paper. The formation of an original image based on the print data on a sheet of paper will be referred to as printing in the following description.

Figure 2:
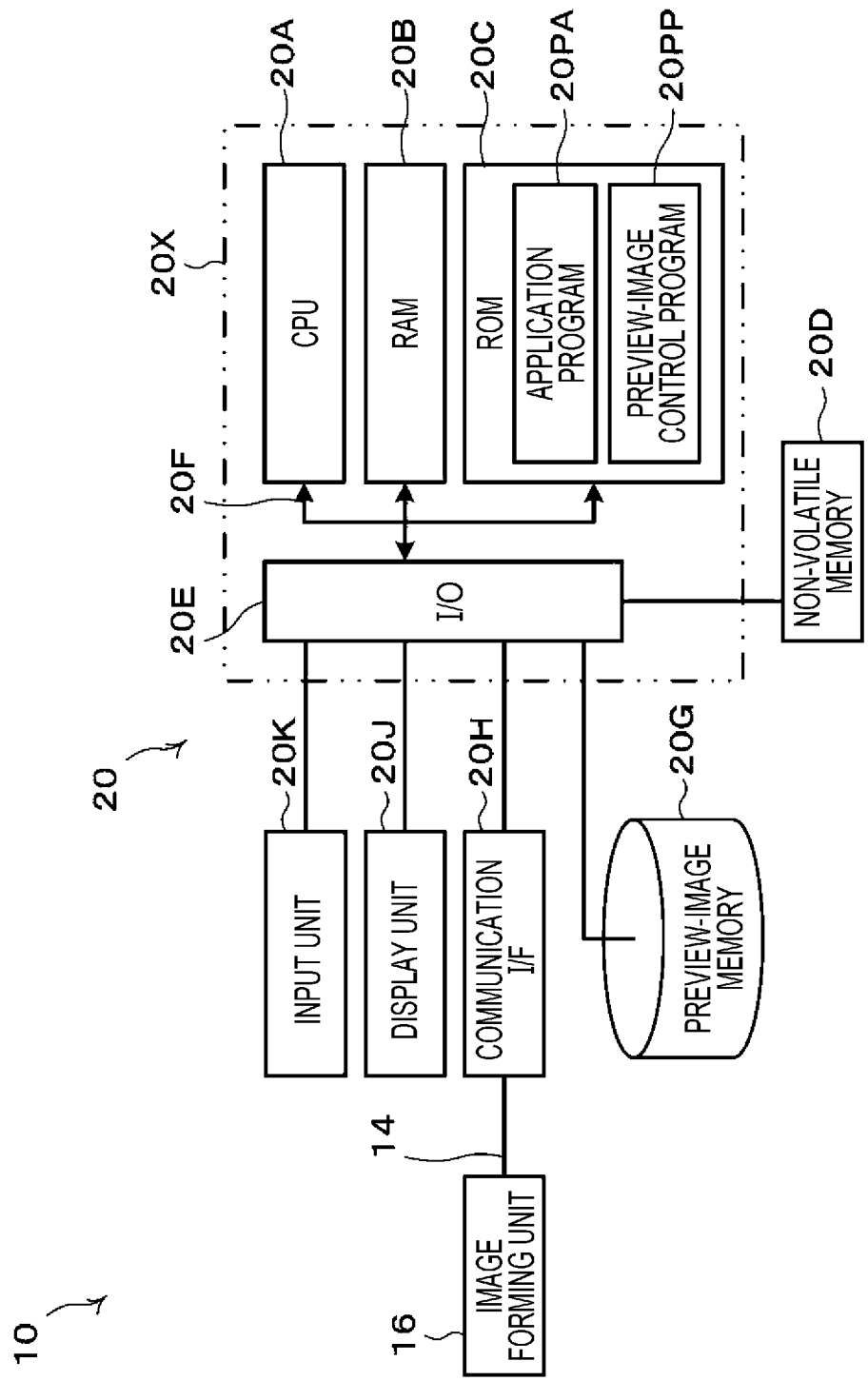
FIG. 2 is a block diagram illustrating an exemplary configuration of the image processing unit according to the first exemplary embodiment.

FIG. 2 illustrates an exemplary configuration of the image processing unit 12 according to this exemplary embodiment. FIG. 2 illustrates an exemplary configuration in which the image processing unit 12 is a computer 20.

The computer 20 includes a computer main body 20X, and in the computer main body 20X, a central processing unit (CPU) 20A, a random access memory (RAM) 20B, a read only memory (ROM) 20C, and an input/output interface (I/O) 20E are connected to one another via a bus 20F, so that each command and data may be transmitted and received. The I/O 20E is connected to a non-volatile memory 20D, a preview-image memory 20G, a communication interface (I/F) 20H, a display unit 20J, and an input unit 20K.

The communication I/F 20H is an interface for performing data communication with an electronic device that is outside the computer 20. In this exemplary embodiment, the communication I/F 20H performs data communication with the image forming unit 16 through the communication line 14.

The display unit 20J includes a device that displays an image and information, such as a display, and the input unit 20K includes an input device such as a keyboard or a mouse for inputting data and commands to the computer main body 20X and for specifying a display position on the display unit 20J. Note that the display unit 20J and the input unit 20K may be formed as a hardware component such as a touch-screen display on which display buttons and various kinds of information are displayed for accepting operation instructions.

The non-volatile memory 20D is a storage device in which various types of initial data are stored in advance. The preview-image memory 20G is a storage device in which image data for forming a reduced image of an original image is temporarily stored before printing.

Note that before printing, an original image to be formed on a sheet of paper P (see FIGS. 3B and 3C, for example) is reduced on the basis of image data stored in the preview-image memory 20G in order to obtain a reduced image to be displayed for preview on the display unit 20J. The reduced image will be referred to as a preview image in the following description. In addition, a preview image based on the image data stored in the preview-image memory 20G will be referred to as a (preview) reduced original image.

The preview-image memory 20G is an exemplary single storage area according to an exemplary embodiment of the disclosed technique, and image data stored in the preview-image memory 20G is exemplary reduced original image data and exemplary background-emphasized reduced image data according to an exemplary embodiment of the disclosed technique.

An application program 20PA and a preview-image control program 20PP to be executed by the computer main body 20X are stored in the ROM 20C included in the computer main body 20X.

The application program 20PA has document processing functions for, for example, processes related to creation of documents and spreadsheets. That is, the CPU 20A reads the application program 20PA from the ROM 20C to be loaded to the RAM 20B and performs document processing in accordance with the application program 20PA. Examples of the document processing include a process for creating an image to be formed on a sheet of paper and a process for creating a table by inputting characters, numeric values, and the like in a specified layout. Examples of the document processing also include a process for print instruction. The process for print instruction is a process for outputting print data of a created image or table to be formed on a sheet of paper as an object in a predetermined format by using the image forming unit 16. Thus, as one of the document processing functions, the application program 20PA has a function of generating and outputting print data so that an original image is formed on the sheet of paper P by using the image forming unit 16. Thus, the CPU 20A performs a process in accordance with the application program 20PA, and accordingly, the computer main body 20X forms an original image including an object to be printed and outputs print data. Note that the application program 20PA may be provided from a recording medium such as a compact-disc (CD)-ROM.

The preview-image control program 20PP has a preview-image control function for displaying, on the display unit 20J before printing, a preview image based on print data, as will be specifically described later. That is, the CPU 20A reads the preview-image control program 20PP from the ROM 20C to be loaded to the RAM 20B and performs a process by using the preview-image control function. The CPU 20A performs a process by using the preview-image control function, and accordingly, the computer main body 20X is operated as the image processing unit 12 illustrated in FIG. 1. Note that the preview-image control program 20PP may be provided from a recording medium such as a CD-ROM.

If a document that is a print target is printed, in some cases, a region may be printed in addition to a print area including an object intended by a user, that is, in addition to an area that a user desires to print.

Figure 3A:
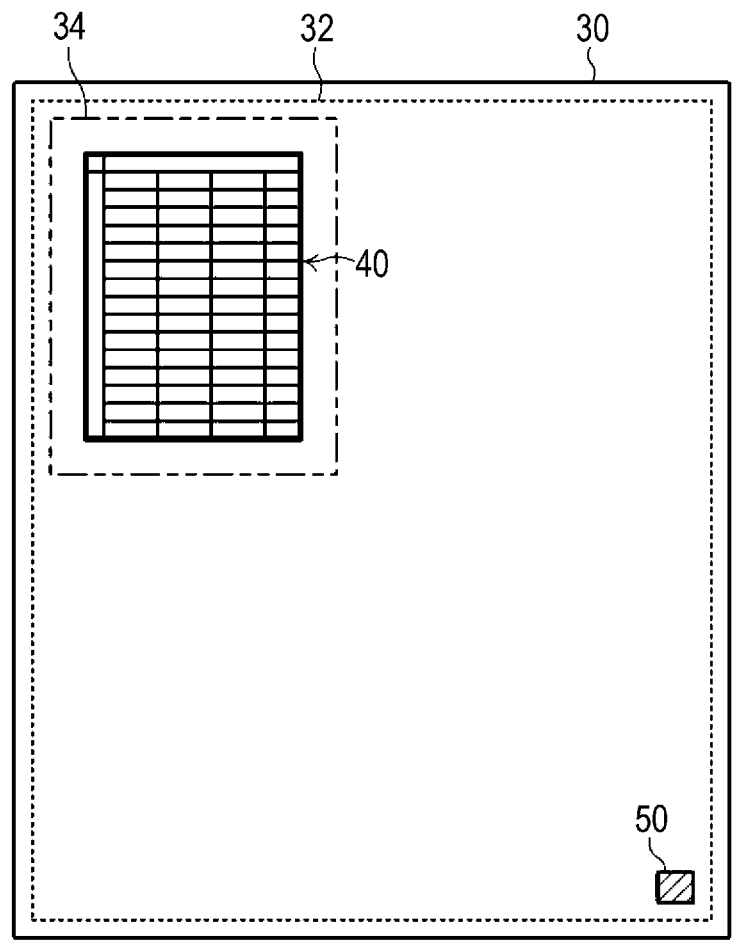
FIG. 3A schematically illustrates an exemplary document including an object that is a print target, and FIGS. 3B and 3C schematically illustrate exemplary sheets of paper on which objects are formed.
Figure 3B:
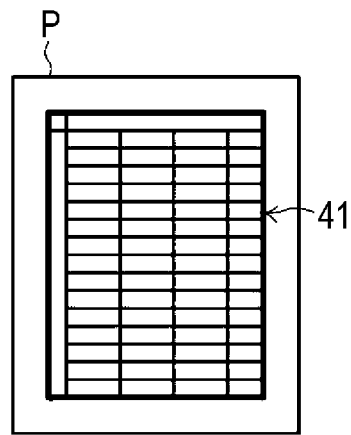
Figure 3C:
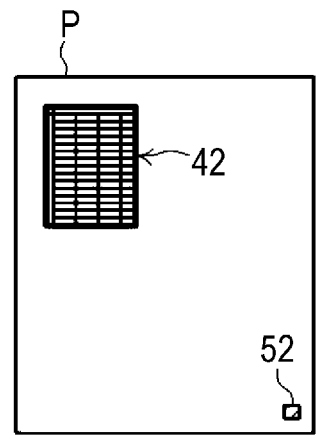

FIG. 3A schematically illustrates an exemplary document including objects, and FIGS. 3B and 3C schematically illustrate exemplary sheets of paper P that have been subjected to printing. FIG. 3A illustrates an example of representing an object intended by a user in a document that is a print target, that is, an object that a user desires to print, as an object 40 when document processing is performed in accordance with the application program 20PA. FIG. 3B illustrates an example of an object image 41 formed on the sheet of paper P, the object image 41 having a size intended by a user, that is, a size of the area that a user desires to print. FIG. 3C illustrates an example of an object image 42 actually formed on the sheet of paper P by using a printing function of the application program 20PA.

As illustrated in FIG. 3A, a user is able to perform document processing in a workable region 30 for document processing in accordance with the application program 20PA. Here, in the examples illustrated in FIGS. 3A to 3C, it is assumed that a user performs document processing in a currently working region 34. It is also assumed in the workable region 30 that an object not intended by a user, that is, an object 50 other than the object that a user desires to print, is present at a position outside the currently working region 34 corresponding to the area that a user desires to print.

Note that the object 50 other than the object that a user desires to print may be present in some cases because, for example, an object used in the past document processing may remain in the current document processing. Alternatively, as a result of an erroneous operation or the like, an object may be present outside the currently working region 34. Note that a case of detecting objects included in a document and outputting print data that is subjected to image processing so as to print all the detected objects on a sheet of paper will be described below as an example of a printing function of the application program 20PA.

As illustrated in FIG. 3B, when issuing an instruction for printing a document, a user expects that the object 40 included in the currently working region 34 be printed as an original image on the sheet of paper P. On the other hand, by implementing a printing function of the application program 20PA, all the objects included in the document are detected, and print data of an original image including all the objects is output. That is, as illustrated in FIG. 3C, image processing is performed so that a machine determination region 32 including the objects 40 and 50 is formed on the single sheet of paper P, and the machine determination region 32 is printed as an original image including the object image 42 and an original image 52 on the sheet of paper P. Accordingly, in the actual printing, the object image 42 that is reduced from the object image 41 expected by the user is printed. In addition, the object image 52 of the object 50 other than the object that a user desires to print is also printed.

In this manner, if the object 50 is present outside the area of the currently working region 34, on the basis of print data that is set such that all the objects are to be formed on a sheet of paper, when a preview image is displayed before printing, a user may miss the object image 52. In addition, since the object image 52 is reduced, it may be difficult for the user to notice the object image 52. Accordingly, the present inventor has found that, if an object is present outside the area including an object that a user desires to print, by displaying a background region of the objects in an emphasized manner, the object other than the object that a user desires to print becomes clear and has a higher visibility.

Next, image processing performed by the image processing unit 12 according to this exemplary embodiment will be described in detail as an exemplary process for increasing the visibility of the object other than the object that a user desires to print.

Figure 4:
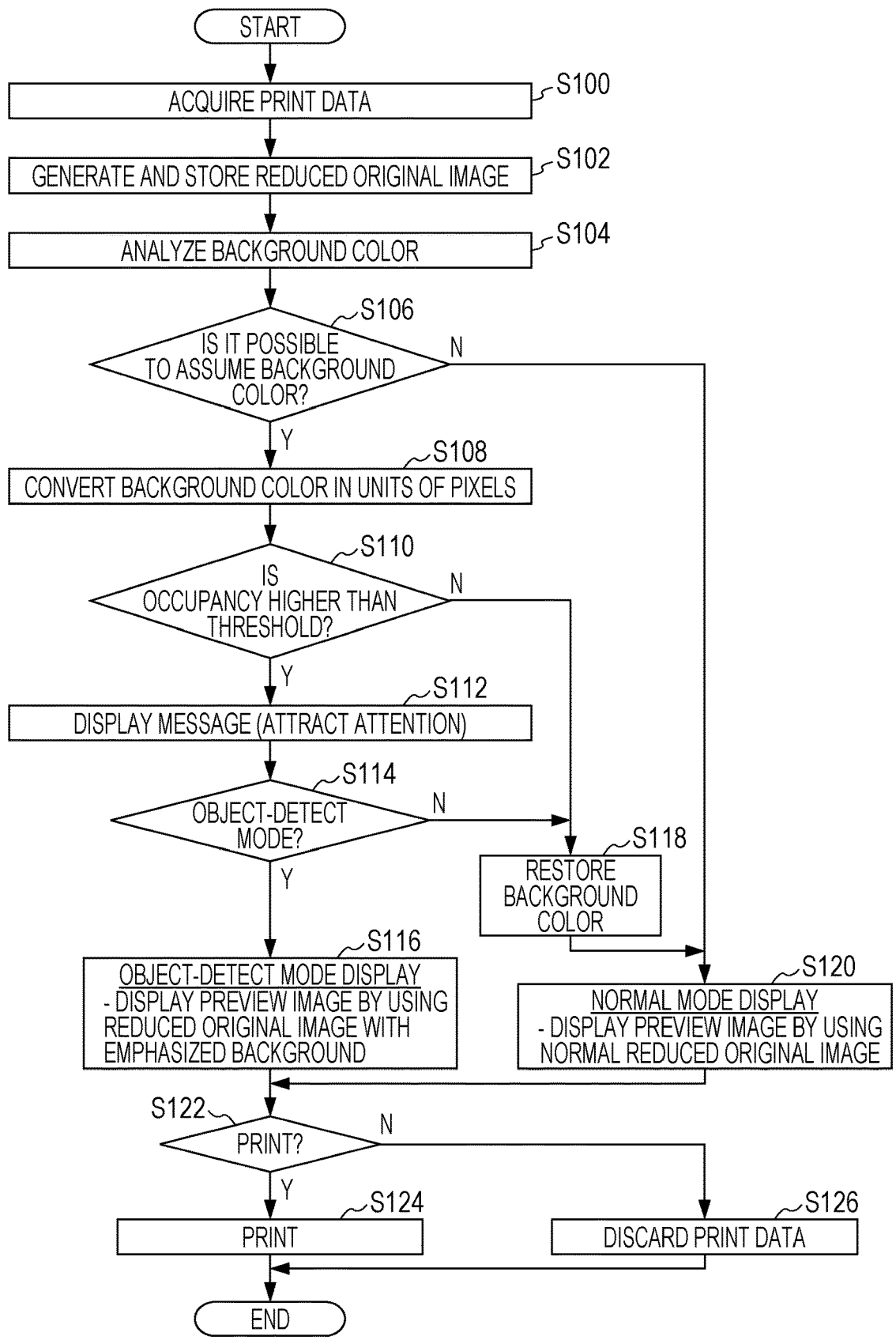
FIG. 4 is a flowchart illustrating a process flow of a preview-image control program according to the first exemplary embodiment.

FIG. 4 illustrates a process flow of the preview-image control program 20PP executed by the CPU 20A of the computer main body 20X included in the computer 20 that is operated as the image processing unit 12.

When the input unit 20K accepts a user's instruction for implementing a printing function in document processing, the CPU 20A executes the preview-image control program 20PP.

First, in step S100, print data that is output from the application program 20PA is acquired. Here, a case will be described in which print data for forming, on the sheet of paper P, an original image that is output from the application program 20PA is acquired, the original image including an object in the machine determination region 32.

Subsequently, in step S102, a generating process for generating a reduced original image on the basis of the print data acquired in step S100 and a storing process for storing image data of the reduced original image that has been generated are performed. The generating process in step S102 is a process for generating a preview reduced original image on the basis of the print data. The storing process is a process for storing image data of the reduced original image that has been generated in the preview-image memory 20G. Examples of the image data of the reduced original image include image data representing a bitmap image. Note that in step S102, a preview image is not displayed yet.

Note that the generating process in step S102 is an exemplary function of a first generation unit according to an exemplary embodiment of the disclosed technique.

Figure 5:
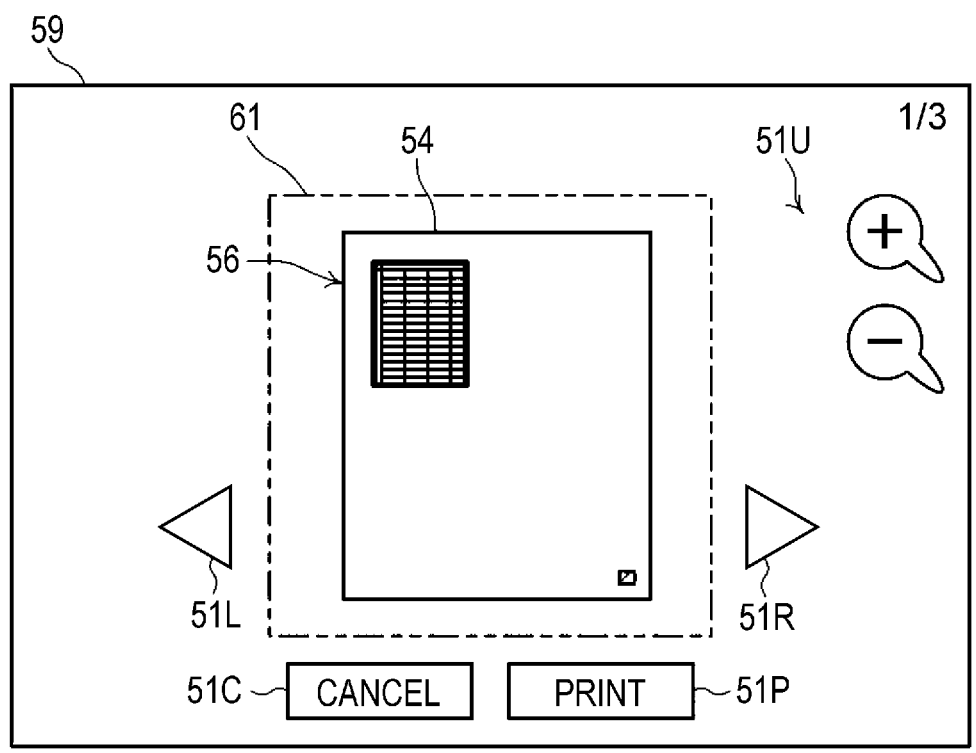
FIG. 5 illustrates an exemplary display screen including a preview image.

FIG. 5 illustrates an exemplary display screen for displaying a preview image on the display unit 20J. Note that although a preview image is not displayed yet in step S102, FIG. 5 illustrates an exemplary case in which a reduced original image 56 is generated and stored in step S102 and is displayed as a preview image 54.

As illustrated in FIG. 5, a display region 61 in which the preview image 54 may be displayed is defined on a display screen 59 of the display unit 20J. If there are plural preview images 54, on the display screen 59, buttons 51R and 51L are provided for sequentially selecting any of the preview images 54 displayed in the display region 61 in one direction or the opposite direction. If there is a single preview image 54, the buttons 51R and 51L do not have to be displayed. In addition, on the display screen 59, a region 51U is defined for arranging instruction buttons for enlarging and reducing the preview image 54 and for changing the displayed position of the preview image 54 that is displayed. Furthermore, below the display region 61 on the display screen 59, an instruction button 51C is provided for suspending (canceling in the example of FIG. 5) printing of a document on the basis of print data, and an instruction button 51P is provided for printing the document on the basis of the print data. Upon the instruction button 51P being selected, the print data is output to the image forming unit 16, an image is formed on the sheet of paper P on the basis of the print data, and the document is printed.

Subsequently, in step S104 illustrated in FIG. 4, a background-color analyzing process is performed on the reduced original image 56 by using image data stored in the preview-image memory 20G. That is, in step S104, image data at a predetermined position of the reduced original image 56 is read from the preview-image memory 20G, and a background color is analyzed by using the read image data of the reduced original image 56.

Figure 6:
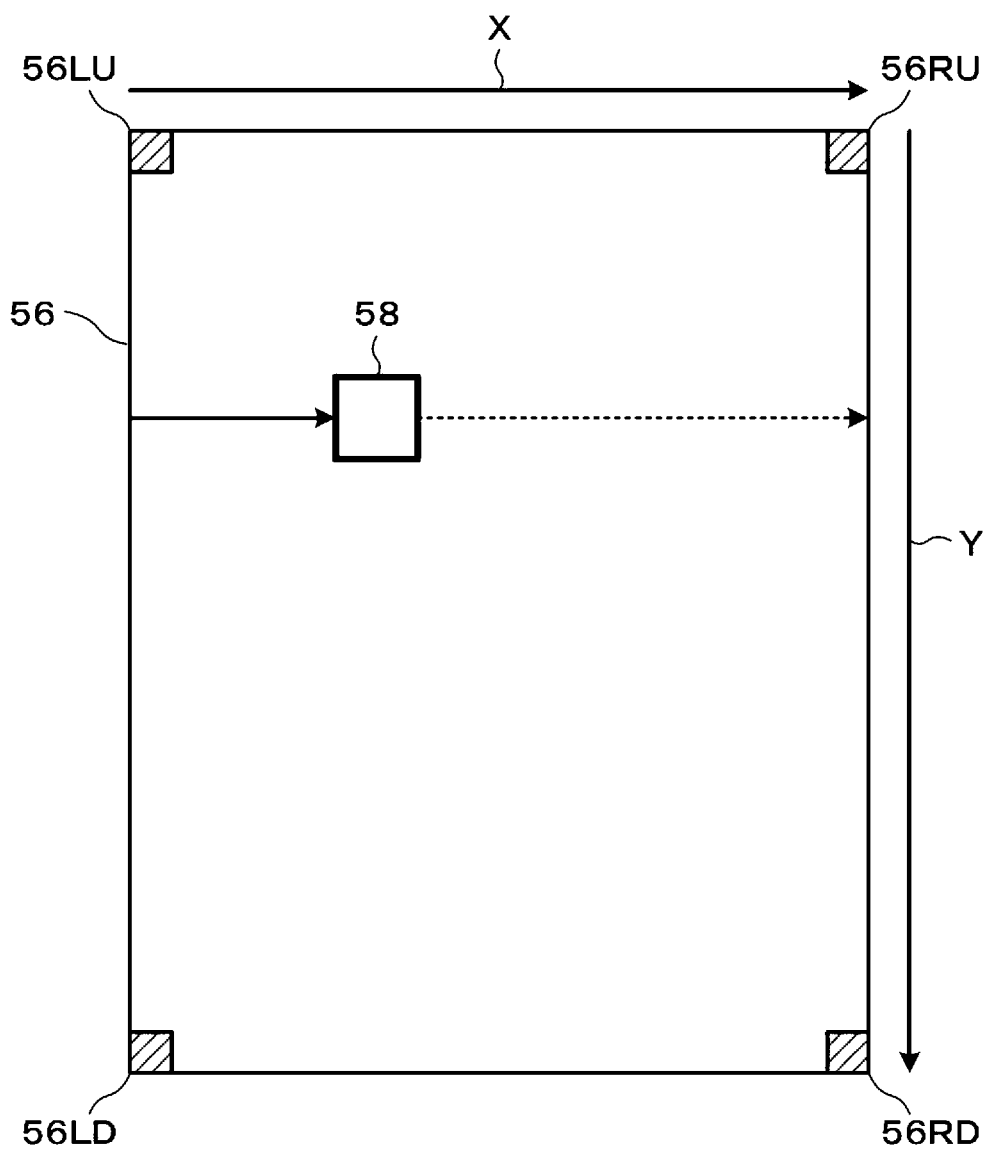
FIG. 6 illustrates an exemplary reduced original image that is an analyzing process target.

FIG. 6 illustrates an example of the reduced original image 56 that is an analyzing process target in step S102.

In this exemplary embodiment, an analyzing process for assuming a background color on the basis of a color value at a predetermined position of the reduced original image 56 is performed. In this exemplary embodiment, corner positions 56RU, 56RD, 56LU, and 56LD in the reduced original image 56 illustrated in FIG. 6 are defined as examples of predetermined positions of the reduced original image 56. Then, from the image data of the reduced original image 56, the color values of the respective units of pixels at the corner positions 56RU, 56RD, 56LU, and 56LD are acquired. The reduced original image 56 is analyzed on the basis of each of the four color values that have been acquired. In the analysis here, if any of the color values matches a color-value condition, the reduced original image 56 is determined as the reduced original image 56 whose background color may be assumed to be the matched color value. Examples of the color-value condition include that a predetermined number (e.g., three) or more of color values among the four color values that have been acquired correspond to one another, and that a change amount in the four color values that have been acquired is lower than a predetermined threshold.

Subsequently, in step S106 illustrated in FIG. 4, as the analysis result in step S104, it is determined whether the reduced original image 56 generated in step S102 is determined as the reduced original image 56 whose background color may be assumed, thereby determining whether the background color may be assumed. If the determination in step S106 is positive, the process proceeds to step S108. On the other hand, if the determination in step S106 is negative, the process proceeds to step S120 in which a normal-mode display process is performed and then proceeds to step S122.

In the normal-mode display process performed in step S120, the reduced original image stored in step S102 is displayed as a preview image on the display unit 20J (see FIG. 5). That is, the image data of the reduced original image 56 is read from the preview-image memory 20G, and the reduced original image 56 based on the read image data is displayed as the preview image 54.

On the other hand, in step S108, a color converting process is performed for converting the background color of the reduced original image 56 in units of pixels in order to emphasize the background of objects included in the reduced original image 56. In the color converting process in step S108, the reduced original image 56 is scanned in units of pixels, so that the background color is converted.

In this exemplary embodiment, in order to perform the process at a high speed, as illustrated in FIG. 6, a group of a predetermined number of pixels (hereinafter referred to as a cell) 58 is scanned vertically and horizontally in the reduced original image 56, and the background color is converted. Here, the cell 58 may be formed of plural pixels arranged either vertically or horizontally or plural pixels arranged vertically and horizontally in the same number or different numbers. In addition, in this exemplary embodiment, the cell 58 is scanned from the upper left position 56LU among the corners in one direction (X direction in the example of FIG. 6) and then is scanned in a direction intersecting the direction (Y direction in the example of FIG. 6), and thereby all the pixels of the reduced original image 56 are scanned.

While the reduced original image 56 is scanned, if the color value of the cell 58 corresponds to the color value of the background color of the reduced original image 56 analyzed in step S104, the color value of the cell 58 is converted to a color value of a specific color. Then, the image data stored as the image data of the reduced original image 56 in the preview-image memory 20G is updated. That is, a process is performed in step S104 for updating, to the converted color value of a specific color, the color value of the image data in the area corresponding to the cell 58 whose color value corresponds to the color value of the background color in the image data stored in the preview-image memory 20G. Note that, not only when the color value of the cell 58 corresponds to the color value of the background color, but also when the average of color values of the cell 58 is the change amount lower than a threshold that has been determined in advance from the color value of the background color, the color value of the cell 58 may be converted to the color value of a specific color.

The specific color to which the background color is converted may be a color that makes the object images 42 and 52 displayed on the display unit 20J outstanding. Thus, in this exemplary embodiment, a complementary color of the background color is set as the specific color. If the contrast is strong by setting the complementary color of the background color as the specific color, a process for softening the contrast may be performed. For example, the contrast may be softened by converting the color value of the background color in accordance with the following formula:

(Output)=$a$·(input)+$b$ where $a<0$, "input" is the color value of the background color that is input, and "output" is the color value of the background color that is output, i.e., the color value of the specific color. In addition, "a" and "b" are each a predetermined constant.

Figure 7:
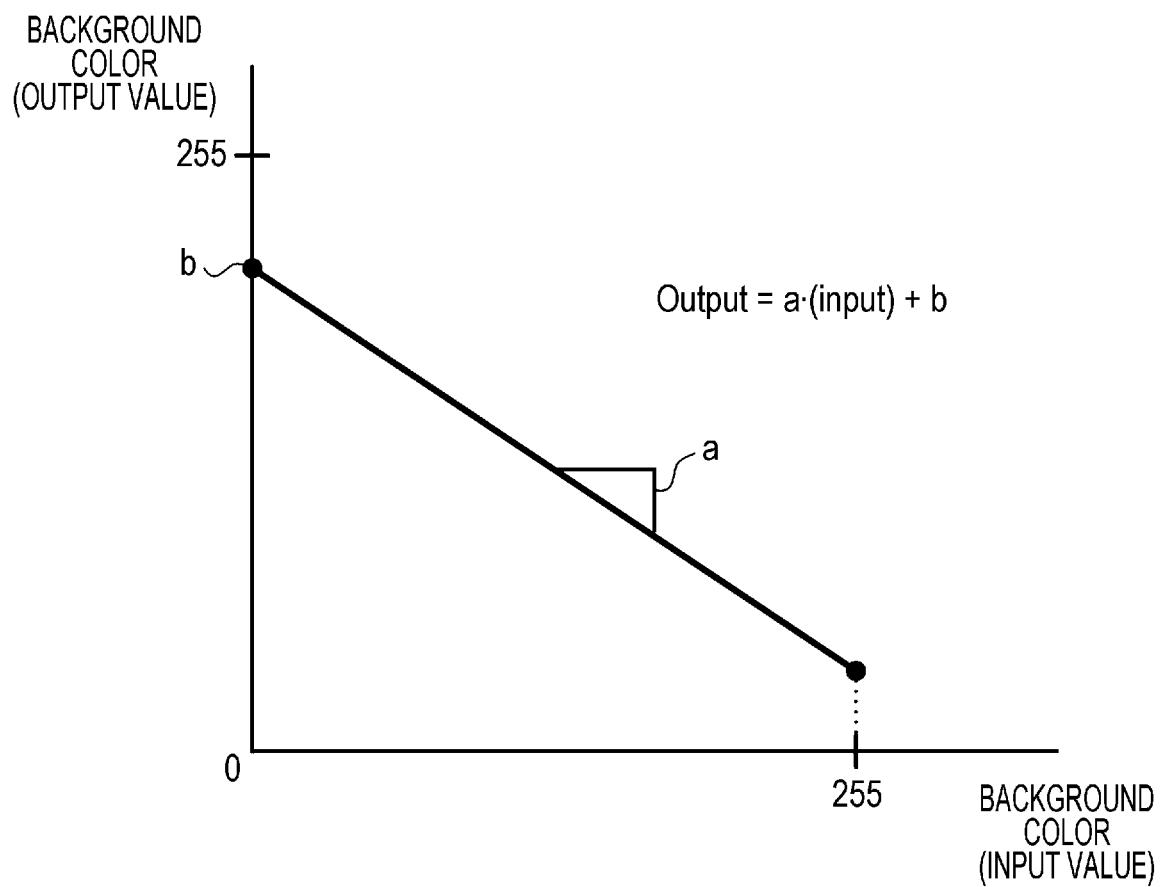
FIG. 7 illustrates exemplary conversion characteristics for converting a color value to a color value of a specific color.

FIG. 7 illustrates exemplary conversion characteristics for converting the color value of the cell 58 to the color value of the specific color in accordance with the above formula.

For example, in order to soften the contrast, the constant a is set to −0.6 and the constant b is set to +230. In this case, if the maximum color value is 255 and a given color is expressed by a color value of three colors, which are red (R), green (G), and blue (B), white (W) has a color value of (R, G, B)=(255, 255, 255), and the specific color corresponding to white has a color value of (R, G, B)=(77, 77, 77). In addition, as another example, yellow having a color value of (R, G, B)–(248, 254, 0) is converted to a specific color that is bluish purple having a color value of (R, G, B)–(81, 78, 230).

Figure 8A:
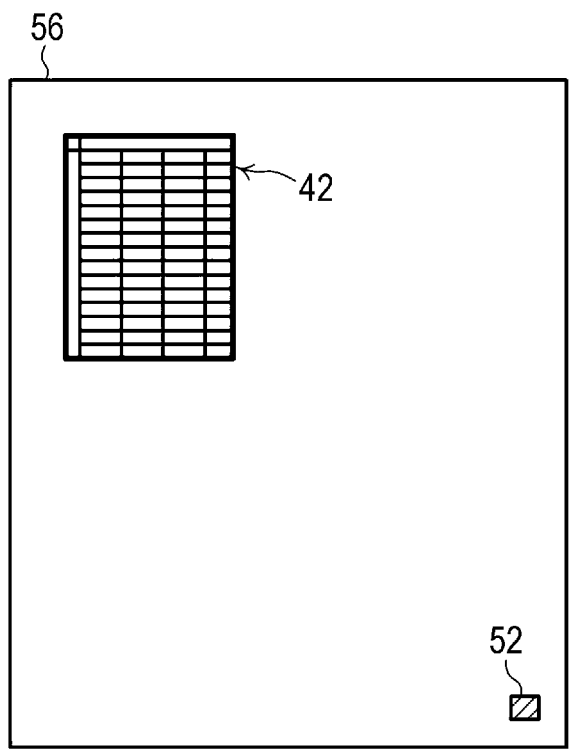
FIG. 8A illustrates an exemplary reduced original image before conversion of a background color of an object image to a specific color.
Figure 8B:
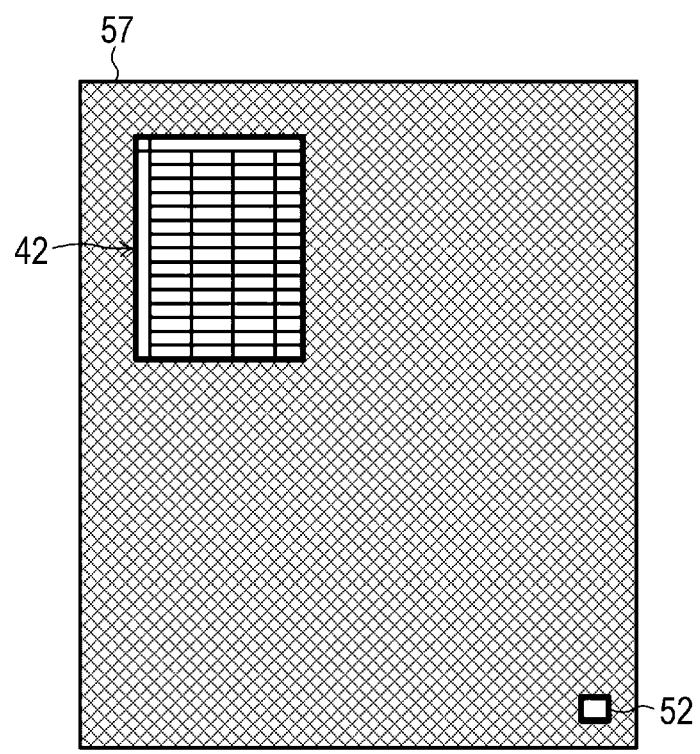
FIG. 8B illustrates an exemplary reduced original image after conversion of the background color of the object image to the specific color.

FIG. 8A illustrates an example of the reduced original image 56 before conversion of the background color of the object images 42 and 52 to a specific color, and FIG. 8B illustrates an example of the reduced original image 56 after conversion of the background color of the object images 42 and 52 to the specific color. FIG. 8A illustrates the reduced original image 56 before conversion to a specific color, that is, the reduced original image 56 based on the image data stored in the preview-image memory 200 in step S102. FIG. 8B illustrates the reduced original image 56 after conversion to a specific color, that is, a reduced original image 57 for preview, in which the background is emphasized in step S108.

As illustrated in FIG. 8B, the object images 42 and 52 are made outstanding by the background color that is emphasized.

Note that in step S108, while the reduced original image 56 is scanned, the number of cells 58 that have been scanned in the reduced original image 56 is counted, and the number of cells 58 that have been subjected to conversion is counted. Then, at the time the scanning of the reduced original image 56 is completed, that is, at the time the scanning of the position including the position 56RD is completed, an occupancy S is calculated in accordance with the following formula:

Occupancy $S=Cs/Ca$ where Cs represents the total number of the cells 58 that have been subjected to conversion, and Ca represents the total number of the cells 58 that have been scanned.

Note that a case has been described above in which, in order to emphasize the background of the objects included in the reduced original image 56, a color converting process is performed on the entire area of the reduced original image 56 as a target in step S108. However, the area that is the target of the color converting process in step S108 is not limited to the entire area of the reduced original image 56. For example, a part of the reduced original image 56 may be set as the target.

FIGS. 9A to 9C illustrate exemplary target areas of the color converting process performed on the reduced original image 56.

In FIG. 9A, the target area is an area in which, if setting is provided in advance such that all the objects are to be printed on a single sheet of paper P, the right margin is reduced to a distance L1, and the bottom margin is reduced to a distance L2, from the upper left position 56LU as a reference among the corners. In FIG. 9B, the target area is an area in which, if setting is provided in advance such that all the objects arranged vertically (in a direction from the upper left position 56LU to the lower left position 56LD) are to be printed on a single sheet of paper P, the bottom margin is reduced to a distance L3 from the upper left position 56LU as a reference among the corners. Likewise, in FIG. 9C, the target area is an area in which, if setting is provided in advance such that all the objects arranged horizontally (in a direction from the upper left position 56LU to the upper right position 56RU) are to be printed on a single sheet of paper P, the right margin is reduced to a distance L4 from the upper left position 56LU as a reference among the corners. In these cases, each target area is subjected to a color converting process, and thereby the object images may be made outstanding in the target area. On the other hand, the background color in the target area is converted to a specific color, and thereby the reduced margin area may be made outstanding.

Note that the color converting process in step S108 is an exemplary function of a second generation unit according to an exemplary embodiment of the disclosed technique. In addition, a process in which the color value of the image data in the area corresponding to the cell 58 whose color value corresponds to the color value of the background color in the color converting process in step S108 is updated to the converted color value of a specific color is an exemplary function of the second generation unit according to an exemplary embodiment of the disclosed technique.

The image data having a color value of a specific color obtained by converting the background color is exemplary image data of a reduced background region of background-emphasized reduced image data according to an exemplary embodiment of the disclosed technique.

Subsequently, in step S110 illustrated in FIG. 4, it is determined whether the occupancy S calculated in step S108 is higher than a predetermined threshold. This step, step S110, is a process for determining whether the background is dominant in the reduced original image 56 that is a target. That is, if the background is dominant in the reduced original image 56 that is a target, it is likely that the reduced original image 56 includes an object image (e.g., the object image 52) other than an object that a user desires to print, compared with the reduced original image 56 in which the background is not dominant. On the other hand, if the background is not dominant in the reduced original image 56 that is a target, it is unlikely that the reduced original image 56 includes an object image (e.g., the object image 52) other than an object that a user desires to print, compared with the reduced original image 56 in which the background is dominant.

Accordingly, if the determination in step S110 is negative, it is determined that it is unlikely that the reduced original image 56 includes an object image other than an object that a user desires to print, and after step S118, a normal-mode display process is performed in step S120. Here, step S118 is a process in which the reduced original image 56 including the background color before conversion is restored from the reduced original image 57 in which the background of the objects is emphasized in step S108, that is, the reduced original image 57 in which the background color is subjected to the color converting process. Specifically, in this exemplary embodiment, the image data of the reduced original image 56 stored in the preview-image memory 20G has been updated to the image data of the reduced original image 57 in which the background is emphasized in step S108. Accordingly, a process is performed in step S118 in which the image data of the normal reduced original image 56 for normal-mode display is restored from the image data of the reduced original image 57 in which the background is emphasized, the image data being stored in the preview-image memory 20G. In step S118, the inverse conversion of the color converting process in step S108 is performed.

On the other hand, if the occupancy S is higher than the threshold and the determination in step S110 is positive, it is determined that it is likely that an object image other than an object that a user desires to print is included, and the process proceeds to step S112. In step S112, in order to attract a user's attention, a process is performed in which a message is displayed on the display unit 20J, the message indicating that it is likely that an object image other than an object that a user desires to print is included. In step S112, a button selectable by a user is displayed, and the process waits for the subsequent process until the user selects the button.

Figure 10:
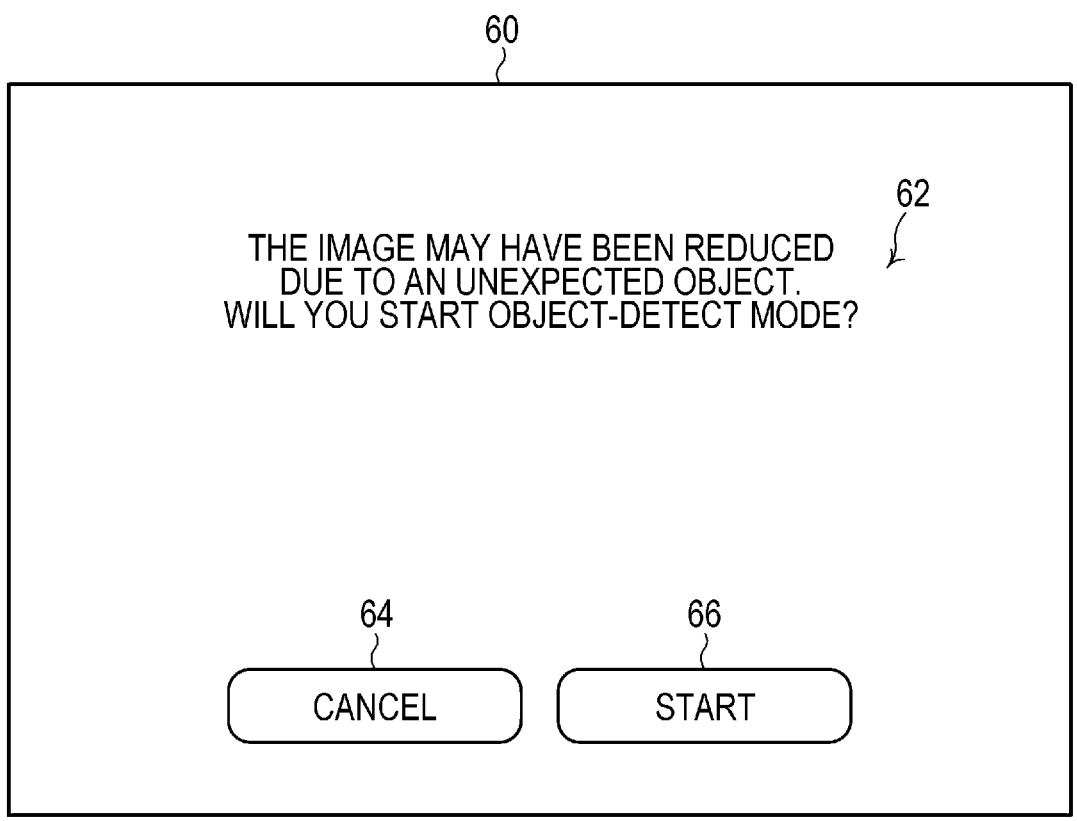
FIG. 10 illustrates an exemplary display screen to be displayed for attracting a user's attention.

FIG. 10 illustrates an exemplary display screen to be displayed for attracting a user's attention.

FIG. 10 illustrates a display screen 60 in which, as an exemplary message, a message 62 is displayed on the display unit 20J, the message 62 including a message "The image may have been reduced due to an unexpected object". In the example illustrated in FIG. 10, the message 62 further includes a message "Will you start object-detect mode?" for encouraging the user's selection. In addition, buttons 64 and 66 for starting and canceling object-detect mode to be selected by the user are disposed on the display screen 60. The selection of the button 64 indicates that the user does not start object-detect mode. On the other hand, the selection of the button 66 indicates that the user starts object-detect mode.

If the button 64 illustrated in FIG. 10 is selected, the determination in step S114 illustrated in FIG. 4 is negative, and the process proceeds to step S118. On the other hand, if the button 66 is selected, the determination in step S114 illustrated in FIG. 4 is positive, and the process proceeds to step S116.

In step S116, an object-detect-mode display process is performed. Specifically, the reduced original image 57 in which the background is emphasized, the reduced original image 57 being stored in the preview-image memory 20G, is displayed on the display unit 20J. That is, the image data of the reduced original image 57 in which the background is emphasized, the reduced original image 57 being stored in the preview-image memory 20G, is read, and the reduced original image 57 is displayed on the display unit 20J (see FIG. 8B).

Note that step S116 is an exemplary function of an output unit according to an exemplary embodiment of the disclosed technique.

Subsequently, in step S122, it is determined which of the instruction button 51C and the instruction button 51P (see FIG. 5) has been selected, thereby determining whether a document print process is to be performed. If the instruction button 51P has been selected, the determination in step S122 is positive, and the print data is output to the image forming unit 16 in step S124, and then, this process routine ends. Thus, the original image based on the print data is formed on the sheet of paper P, and a document is printed. On the other hand, if the instruction button 51C has been selected, the determination in step S122 is negative, and printing of the document based on the print data is canceled in step S126, and then this process routine ends. In step S126, the print data is discarded without being output to the image forming unit 16. In step S126, further, the image data of the reduced original image 56 or the reduced original image 57 stored in the preview-image memory 20G is also deleted.

As described above, in this exemplary embodiment, color conversion is performed so that the background image of an object has such a color that makes the object outstanding, and thereby the visibility of the object outside the area including an object that a user desires to print may be increased.

In addition, in this exemplary embodiment, the reduced original image 56 stored in the preview-image memory 20G is updated to the reduced original image 57 in which the background is emphasized, and thereby, the memory capacity of the preview-image memory 20G that stores the reduced original image 56 may be reduced.

Second Exemplary Embodiment

Next, a second exemplary embodiment will be described. In the second exemplary embodiment, the reduced original image 56 or the reduced original image 57 may be displayed at a high speed. Note that the second exemplary embodiment provides substantially the same configuration as that in the first exemplary embodiment, and thus, substantially the same parts will be denoted by the same reference numerals, and a detailed description will be omitted.

Figure 11:
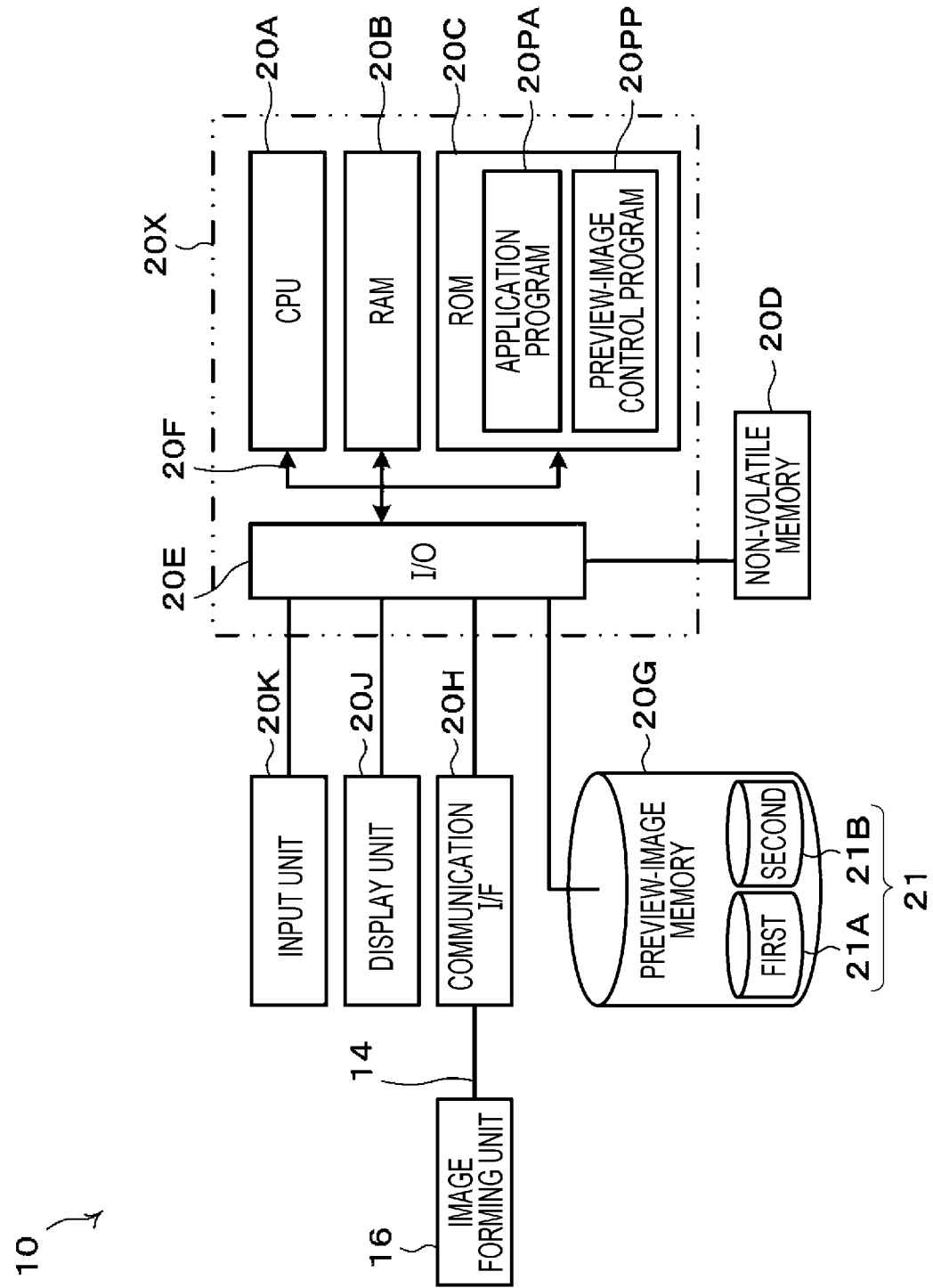
FIG. 11 is a block diagram illustrating an exemplary configuration of an image processing unit according to a second exemplary embodiment.

FIG. 11 illustrates an exemplary configuration of the image processing unit 12 according to the second exemplary embodiment formed of the computer 20. As illustrated in FIG. 11, in the image processing unit 12 formed of the computer 20 according to the second exemplary embodiment, the preview-image memory 20G includes a buffer 21 including a first buffer 21A and a second buffer 21B. Each of the first buffer 21A and the second buffer 21B has a memory capacity large enough to store the image data of the reduced original image 56.

Note that the buffer 21 included in the preview-image memory 20G is an exemplary single storage area according to an exemplary embodiment of the disclosed technique, the first buffer 21A is an exemplary first storage area, and the second buffer 21B is an exemplary second storage area.

Next, exemplary image processing of the image processing unit 12 according to the second exemplary embodiment will be described in detail.

Figure 12:
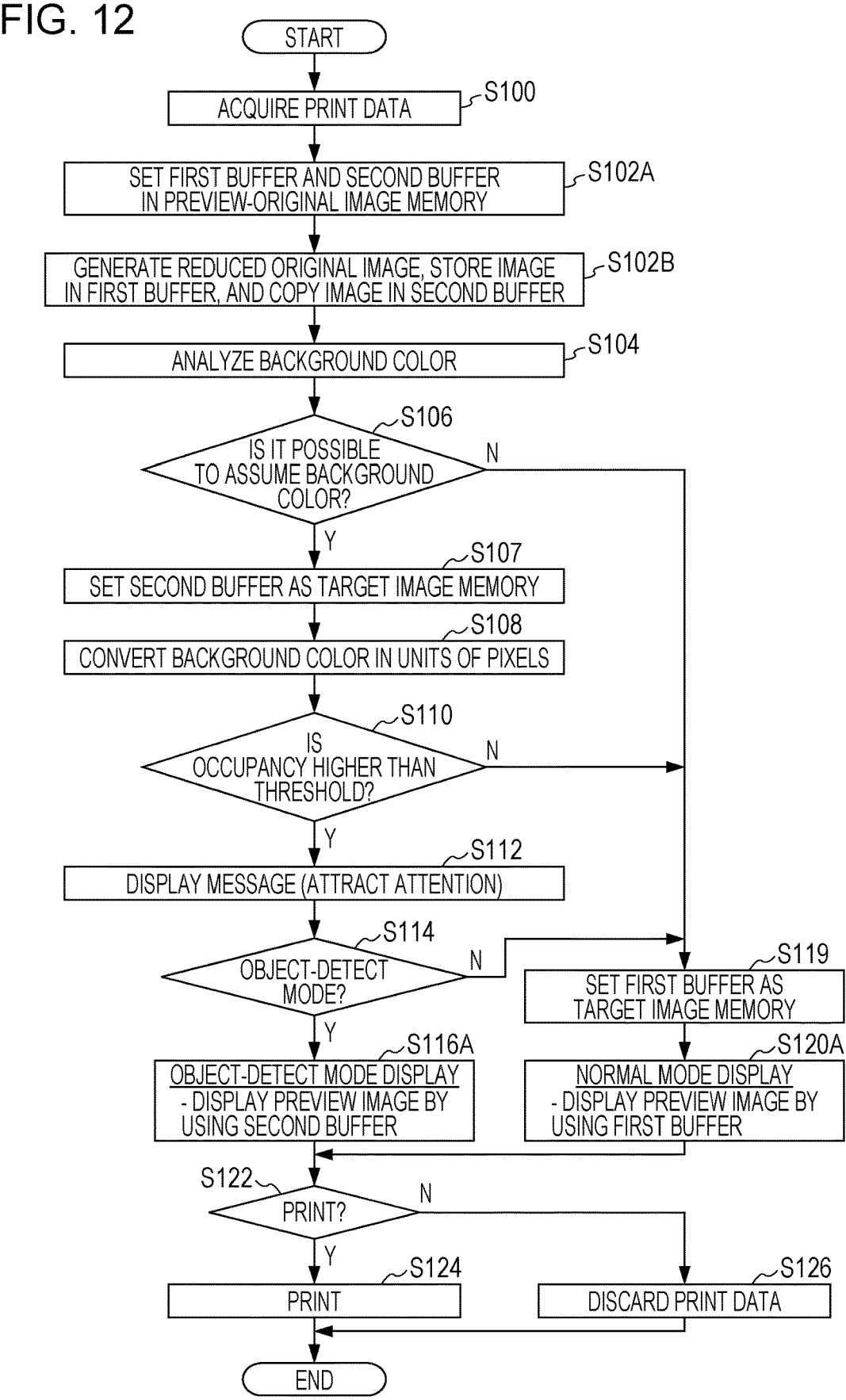
FIG. 12 is a flowchart illustrating a process flow of a preview-image control program according to the second exemplary embodiment.

FIG. 12 illustrates a process flow of the preview-image control program 20PP executed by the CPU 20A of the computer main body 20X included in the computer 20 that operates as the image processing unit 12 according to the second exemplary embodiment.

Note that in the process of the preview-image control program 20PP illustrated in FIG. 12, step S102 illustrated in FIG. 4 is changed to step S102A and step S102B. In addition, step S107 is added between step S106 and step S108. Further, step S116 illustrated in FIG. 4 is changed to step S116A, and step S120 is changed to step S120A. Further, step S119 is added immediately before step S120A.

First, print data is acquired in step S100, and then in step S102A, the first buffer 21A and the second buffer 21B of the buffer 21 included in the preview-image memory 20G are set as image memories that store the reduced original image 56. Subsequently, in step S102B, as in step S102 illustrated in FIG. 4, a generating process for generating a reduced original image on the basis of the print data acquired in step S100 and a storing process for storing image data of the reduced original image that has been generated are performed. Note that in the storing process in step S102B, image data representing the reduced original image that has been generated is stored in the first buffer 21A that is set in the preview-image memory 20G, and then a process for copying the image data in the second buffer 21B is performed.

Subsequently, in step S104, the background-color analyzing process is performed, and in step S106, it is determined whether it is possible to assume the back ground color. If the determination in step S106 is positive, the process proceeds to step S107. On the other hand, if the determination in step S106 is negative, the process proceeds to step S119. In step S119, the first buffer 21A is set as a target image memory that stores the reduced original image 56, and in step S120A, the reduced original image 56 stored in the first buffer 21A is displayed as the preview image 54 on the display unit 20J (see FIG. 5). That is, the image data of the reduced original image 56 is read from the first buffer 21A of the preview-image memory 20G, and the reduced original image 56 based on the read image data is displayed on the preview image 54.

On the other hand, in step S107, the second buffer 21B is set as a target image memory that stores the reduced original image 56, and in step S108, and a color converting process is performed for converting the background color of the reduced original image 56 stored in the second buffer 21B. Subsequently, the determination in step S110 is negative if the occupancy S is lower than the predetermined threshold, and the first buffer 21A is set as a target image memory that stores the reduced original image 56 in step S119, and then, a normal-mode display process is performed in step S120. In this exemplary embodiment, since the first buffer 21A and the second buffer 21B are switched, it is unnecessary to restore the image data of the normal reduced original image 56. Thus, step S118 illustrated in FIG. 4 is unnecessary.

Note that the process for setting the second buffer 21B as the target image memory in stop S107 and the process for setting the first buffer 21A as the target image memory in step S119 are exemplary functions of a switching unit according to an exemplary embodiment of the disclosed technique.

On the other hand, if the occupancy S is higher than the threshold and the determination in step S110 is positive, in step S112, a process is performed in which a message for attracting a user's attention is displayed on the display unit 20J. If object-detect mode is not selected by a user, the determination in step S114 is negative, and the process proceeds to step S119. On the other hand, if object-detect mode is selected by a user, the determination in step S114 is positive, and the process proceeds to step S116A.

In step S116A, an object-detect-mode display process is performed. That is, the reduced original image 57 in which the background is emphasized, the reduced original image 57 being stored in the second buffer 21B of the preview-image memory 20G, is displayed on the display unit 20J.

As described above, according to the second exemplary embodiment, the buffer is switched between the first buffer 21A that stores the normal reduced original image 56 and the second buffer 21B that stores the reduced original image 57 in which the background is emphasized. Thus, it is possible to omit a process for restoring the normal reduced original image 56 from the reduced original image 57 in which the background is emphasized, thereby displaying the normal reduced original image 56 in a short period of time.

Figure 13:
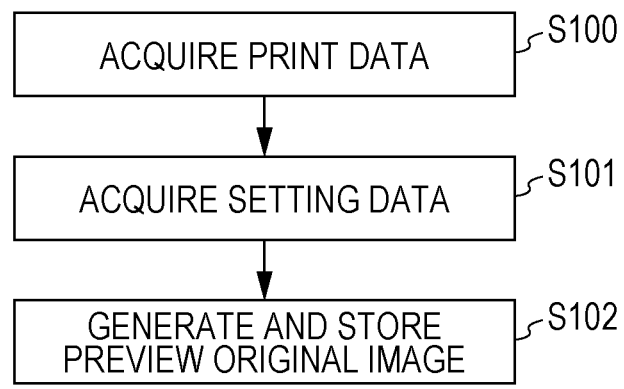
FIG. 13 is a flowchart illustrating an exemplary flow of a process for automatically selecting object-detect mode.

Note that in each of the exemplary embodiments, the process in object-detect mode is performed if a user selects object-detect mode. However, object-detect mode may be automatically selected. In this case, as illustrated in FIG. 13, step S101 is added between step S100 and step S102 (or step S102A). In step S101, setting data indicating the performance of the process in object-detect mode is acquired. Subsequently, in step S114, the determination is performed on the basis of a set value that is acquired in step S101.

The exemplary embodiments of the present invention have been described above. However, the technical scope of the present invention is not limited to the scope of the exemplary embodiments described above. It is possible to make modifications or improvements on the exemplary embodiments in various manners without departing from the spirit of the invention, and such modifications or improvements are also included in the technical scope of the present invention.

In addition, the processes in the flowcharts are performed by software in the above exemplary embodiments. However, the present invention is not limited to these exemplary embodiments, and for example, the processes performed by software may be realized by a hardware configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor configured to:
generate reduced original image data for forming a reduced image of an original image to be formed on the basis of print data;
generate background-emphasized reduced image data for forming a reduced image in which a reduced background region is emphasized to enhance visibility of the reduced image, the reduced background region corresponding to a background region of an object included in the original image; and
output the reduced original image data or the background-emphasized reduced image data, and the background-emphasized reduced image data is output if a ratio of the reduced background region to all regions in the reduced image exceeds a threshold.

2. The image processing apparatus according to claim 1, wherein image data of the reduced background region in the background-emphasized reduced image data is generated on the basis of the background region or the reduced background region.

3. The image processing apparatus according to claim 2, wherein the image data of the reduced background region in the background-emphasized reduced image data is image data of a complementary color of the background region or the reduced background region.

4. The image processing apparatus according to claim 3, wherein in the image data of the complementary color, a degree of the complementary color is changeable in accordance with color components of the background region or the reduced background region.

5. The image processing apparatus according to claim 1, wherein image data of the reduced background region in the background-emphasized reduced image data is image data of a complementary color of the background region or the reduced background region.

6. The image processing apparatus according to claim 5, wherein in the image data of the complementary color, a degree of the complementary color is changeable in accordance with color components of the background region or the reduced background region.

7. The image processing apparatus according to claim 1, wherein the processor is configured to cause the reduced original image data to be stored in a single storage area, and wherein the processor is configured to emphasize image data of the reduced background region in the reduced original image data stored in the single storage area to generate the background-emphasized reduced image data.

8. The image processing apparatus according to claim 7, wherein, if the reduced original image data is used after the background-emphasized reduced image data has been generated, the processor is configured to restore the reduced original image data from the background-emphasized reduced image data stored in the single storage area.

9. A non-transitory computer readable medium storing a program causing a computer to execute a process for image processing, the process comprising:
generating reduced original image data for forming a reduced image of an original image to be formed on the basis of print data;
generating background-emphasized reduced image data for forming a reduced image in which a reduced background region is emphasized to enhance visibility of the reduced image, the reduced background region corresponding to a background region of an object included in the original image; and
outputting the reduced original image data or the background-emphasized reduced image data, and the background-emphasized reduced image data is output if a ratio of the reduced background region to all regions in the reduced image exceeds a threshold.

10. An image processing apparatus comprising:
a processor configured to:
generate reduced original image data for forming a reduced image of an original image to be formed on the basis of print data;
generate background-emphasized reduced image data for forming a reduced image in which a reduced background region is emphasized to enhance visibility of the reduced image, the reduced background region corresponding to a background region of an object included in the original image;
cause the reduced original image data to be stored in a single storage area; and
emphasize image data of the reduced background region in the reduced original image data stored in the single storage area to generate the background-emphasized reduced image data.

* * * * *